United States Patent [19]
Sasso

[11] Patent Number: 5,490,210
[45] Date of Patent: Feb. 6, 1996

[54] PROGRAMMABLE TELEPHONE INTERFACE DEVICE

[76] Inventor: Bill J. Sasso, 8222 Furlong, Houston, Tex. 77071

[21] Appl. No.: 162,755

[22] Filed: Dec. 7, 1993

[51] Int. Cl.$^6$ ................................................. H04M 11/00
[52] U.S. Cl. ............................. 379/100; 379/97; 379/94; 379/102
[58] Field of Search .................... 379/93, 94, 95, 379/96, 97, 98, 100, 102, 104, 105, 377, 382, 381, 88, 89

[56] References Cited

U.S. PATENT DOCUMENTS

| | | | |
|---|---|---|---|
| 4,731,829 | 3/1988 | Bonnet et al. | 379/377 |
| 4,847,892 | 7/1989 | Shelley | 379/93 |
| 5,048,076 | 9/1991 | Maurer et al. | 379/94 |
| 5,056,132 | 10/1991 | Coleman et al. | 379/95 |
| 5,062,133 | 10/1991 | Melrose | 379/94 |
| 5,131,026 | 7/1992 | Park | 379/100 |
| 5,140,631 | 8/1992 | Stahl | 379/377 |
| 5,283,638 | 2/1994 | Engberg et al. | 379/100 |

*Primary Examiner*—Jason Chan
*Attorney, Agent, or Firm*—Kenneth A. Roddy

[57] ABSTRACT

A programmable telephone interface device connects to a telephone subscriber line and automatically controls the operation of facsimile equipment and telephone equipment connected to the device. The device includes a microprocessor having stored programs in memory for receiving and interpreting digital signals. Ports on the device allow connection of at least one telephone, a telephone answering device, and a facsimile machine. One or more outgoing messages can be recorded and stored in memory. An AC ringing voltage on the subscriber line representing an incoming telephone call is detected by a ring detection circuit and a DC pulse detection circuit detects changes in the current on the telephone subscriber line representing pulse dials, off-hook signals, and canceled calls. Facsimile transmission (CNG) signals and dual tone multi-frequency (DTMF) tones are filtered, decoded and converted to digital signals by a filter and decoder circuit which are interpreted by the microprocessor. The microprocessor selects a port corresponding to the type of signal detected and causes a ring voltage signal to be generated to activate the telephone equipment or facsimile machine connected to the selected port. The ring voltage signal is sent to the facsimile port if the detected signal is a CNG signal or a predetermined DTMF tone representing the facsimile port, or is sent to the telephone port or the telephone answering device port if a CNG signal is not detected or if the detected signal is a predetermined DTMF tone representing a particular port.

17 Claims, 3 Drawing Sheets

PROGRAMMABLE TELEPHONE INTERFACE DEVICE

BACKGROUND OF THE INVENTION

1. Field of the Invention

This invention relates generally to telephone answering systems, and more particularly to a programmable telephone interface device which can be programmed to perform various operations responsive to user input dual tones and CNG signals.

2. Brief Description of the Prior Art

There are a number of telephone answering systems and facsimile apparatus which will automatically switch an incoming call between a telephone or a facsimile machine and will allow a caller to choose to be connected to a specific telephone extension by pushing one or more keys on a standard touch tone telephone keypad.

Hashimoto, U.S. Pat. No. 4,584,434 discloses a system wherein a telephone answering device (TAD) is activated upon receipt of a ringing signal to send an outgoing message (OGM) and thereafter the calling party must leave a message or enter a code by pressing touch tone buttons to activate a facsimile machine. The device requires input by the calling party and is therefore not substantially automatic.

Bowen, U.S. Pat. No. 4,910,764 discloses a facsimile and voice communications device which allows a telephone and facsimile machine to share a common telephone line. The device answers the telephone and listens for a calling signal (CNG) and will automatically default to a facsimile machine upon receiving a CNG signal. It can also respond to touch tones, however it is only capable of connecting to a facsimile machine and allows hang-up only after detecting a dial tone which ties up the system before resetting. It also does not provide a true dual tone decoder.

Hashimoto, U.S. Pat. No. 4,974,253 discloses a facsimile apparatus incorporating a telephone answering machine. The device has a digital outgoing message (OGM) with a calling signal (CNG) interrupt and can receive dual tone (DTMF) manual inputs, however the discriminating signal is the handshaking signal CNG of a calling facsimile machine and it only responds to an incoming call after the answering machine has finished the outgoing message.

Bowen, U.S. Pat. No. 4,910,764 discloses a central interface telephone answering unit and a series of remote units connected therewith which answers the telephone and listens for a calling signal (CNG) and will automatically default to a facsimile machine upon receiving a CNG signal. Each of the remote units responds to a predetermined tone frequency and when the caller pushes a touch tone key, to select a specific extension, the responding remote unit generates a ringing signal for that extension. The central unit resets when a dial tone is detected after a caller hangs up or when a remote extension completes the call.

The present invention is distinguished over the prior art in general, and these patents in particular by a programmable telephone interface device which connects to a telephone subscriber line and automatically controls the operation of facsimile equipment and telephone equipment connected to the device. The device includes a microprocessor having stored programs in memory for receiving and interpreting digital signals. Ports on the device allow connection of at least one telephone, a telephone answering device, and a facsimile machine. One or more outgoing messages can be recorded and stored in memory. An AC ringing voltage on the subscriber line representing an incoming telephone call is detected by a ring detection circuit and a DC pulse detection circuit detects changes in the current on the telephone subscriber line representing pulse dials, off-hook signals, and canceled calls. Facsimile transmission (CNG) signals and dual tone multi-frequency (DTMF) tones are filtered, decoded and converted to digital signals by a filter and decoder circuit which are interpreted by the microprocessor. The microprocessor selects a port corresponding to the type of signal detected and causes a ring voltage signal to be generated to activate the telephone equipment or facsimile machine connected to the selected port. The ring voltage signal is sent to the facsimile port if the detected signal is a CNG signal or a predetermined DTMF tone representing the facsimile port, or is sent to the telephone port or the telephone answering device port if a CNG signal is not detected or if the detected signal is a predetermined DTMF tone representing a particular port.

SUMMARY OF THE INVENTION

It is therefore an object of the present invention to provide a programmable telephone interface device which is easily connected to a telephone subscriber line and automatically controls the operation of facsimile equipment, telephone equipment, or other peripheral devices connected to the device.

It is another object of this invention to provide a programmable telephone interface device which will automatically detect facsimile transmission (CNG) signals, DTMF tones, pulse dials, off-hook signals, and canceled calls.

Another object of this invention is to provide a programmable telephone interface device having a ring detection circuit which is always listening for an incoming signal and utilizes a solid state dual opto isolator, thus it is substantially faster than devices utilizing a mechanical relay.

Another object of this invention is to provide a programmable telephone interface device which may be programmed to generate various ring patterns for each port including a standard American ring pattern, a European ring pattern, a U.K. (British) ring pattern, and a distinctive ring pattern.

Another object of this invention is to provide a programmable telephone interface device which may be programmed through any touch tone telephone.

Another object of this invention is to provide a programmable telephone interface device having operational programs stored in memory which can be selectively invoked by punching in dual tones from any touch tone telephone.

Another object of this invention is to provide a programmable telephone interface device which can be programmed to require entry of a personal identification number (PIN) before programming operations to prevent unauthorized programming.

Another object of this invention is to provide a programmable telephone interface device which can be programmed to require entry of access codes to each port to prevent unauthorized access, and unwanted telephone calls.

Another object of this invention is to provide a programmable telephone interface device having a toll blocking program stored in memory which can be selectively activated to block 1-900, 0-900, 1-976, and 0-976 calls.

Another object of this invention is to provide a programmable telephone interface device having a pulse dialing program stored in memory which can be selectively activated to allow a telephone device to do pulse dialing.

Another object of this invention is to provide a programmable telephone interface device having a Global Connect program stored in memory which can be selectively activated to allow long distance calls to be initiated by the device from a call made from a remote location to take advantage of the least expensive long distance rate.

Another object of this invention is to provide a programmable telephone interface device wherein transfer functions between ports can be performed from any telephone plugged into the device or any extension phone on the same line to bring devices plugged into the ports on-line.

Another object of this invention is to provide a programmable telephone interface device which does not wait for a dial tone signal to return to the ready state, but instead senses the "loop subscriber cancellation pulse" and resumes the ready state the moment a caller hangs up.

Another object of this invention is to provide a programmable telephone interface device which can be used as an intercom between two or more telephones that are plugged into the ports wherein two or more users can converse, in an intercom mode, off of the main telephone subscriber line.

A further object of this invention is to provide a programmable telephone interface device having interchangeable microprocessor chips with different software programming and operating systems responsive to dual tones and incoming call signals. A user can select various operating functions by purchasing the latest version of the communication or interface program without having to purchase a whole new unit.

A still further object of this invention is to provide a programmable telephone interface device which is simple in construction, economical to manufacture, and reliable in use.

Other objects of the invention will become apparent from time to time throughout the specification and claims as hereinafter related.

The above noted objects and other objects of the invention are accomplished by a programmable telephone interface device which connects to a telephone subscriber line and automatically controls the operation of facsimile equipment and telephone equipment connected to the device. The device includes a microprocessor having stored programs in memory for receiving and interpreting digital signals. Ports on the device allow connection of at least one telephone, a telephone answering device, and a facsimile machine. One or more outgoing messages can be recorded and stored in memory. An AC ringing voltage on the subscriber line representing an incoming telephone call is detected by a ring detection circuit and a DC pulse detection circuit detects changes in the current on the telephone subscriber representing pulse dials, off-hook signals, and canceled calls. Facsimile transmission (CNG) signals and dual tone multi-frequency (DTMF) tones are filtered, decoded and converted to digital signals by a filter and decoder circuit which are interpreted by the microprocessor. The microprocessor selects a port corresponding to the type of signal detected and causes a ring voltage signal to be generated to activate the telephone equipment or facsimile machine connected to the selected port. The ring voltage signal is sent to the facsimile port if the detected signal is a CNG signal or a predetermined DTMF tone representing the facsimile port, or is sent to the telephone port or the telephone answering device port if a CNG signal is not detected or if the detected signal is a predetermined DTMF tone representing a particular port.

DESCRIPTION OF THE PREFERRED EMBODIMENT

Figure 1:
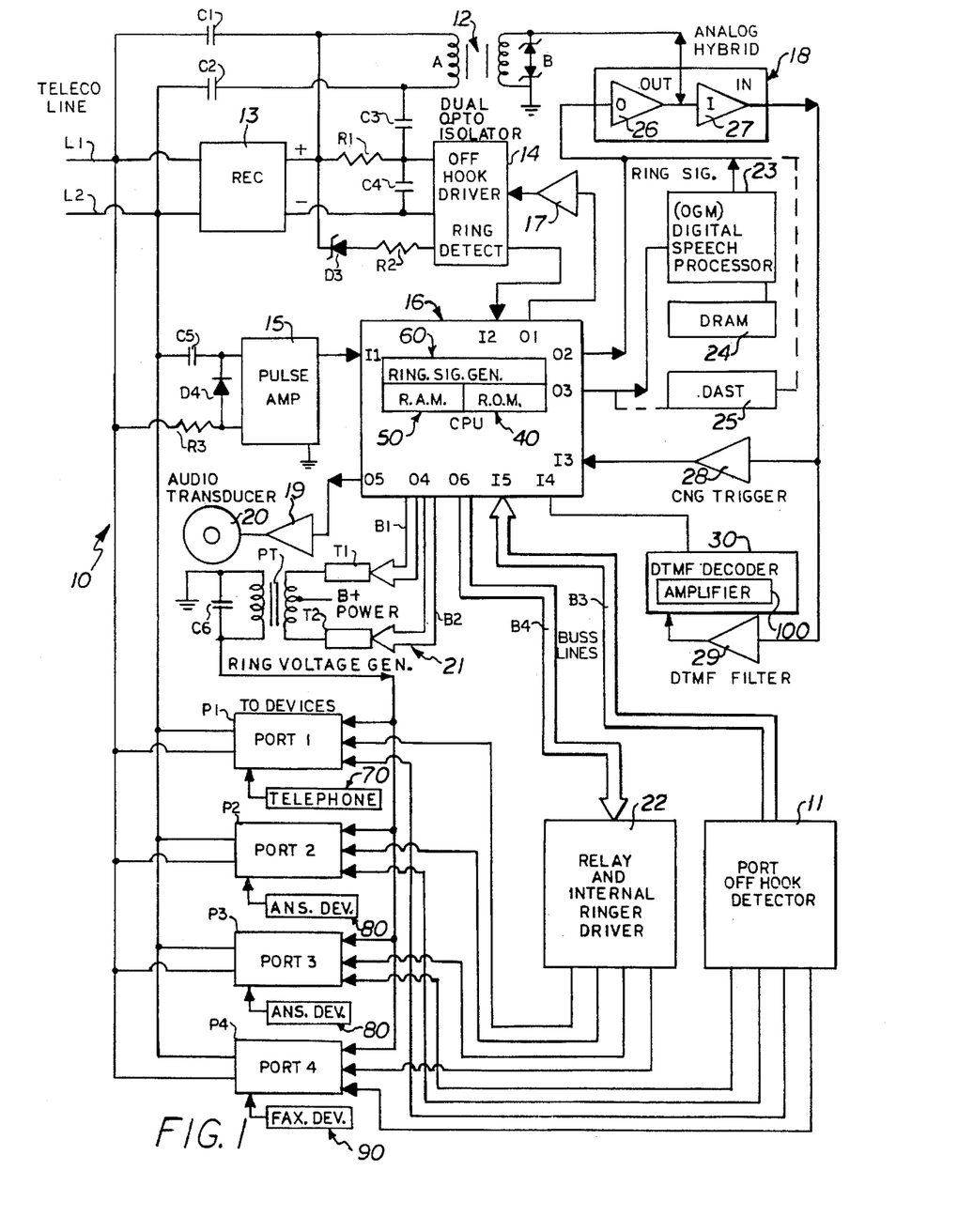
FIG. 1 is a schematic diagram of the circuitry used in the programmable telephone interface device in accordance with the present invention.

Referring to the drawings by numerals of reference, there is shown in FIG. 1, a schematic diagram of the circuitry used in the programmable telephone interface device 10 in accordance with the present invention.

Reference letters L1 and L2 denote conventional two wire telephone lines which are connected to a conventional telephone outlet jack and form what is known as the "subscriber loop". The device is coupled to the conventional two wire telephone lines L1 and L2, by a standard telephone cable and modular plugs. The device has a series of ports P1, P2, P3, and P4 into which various devices to be operated are plugged. For example, at least one standard telephone 70 is plugged into one port, a Telephone Answering Device (TAD) 80 is plugged into another port, and a facsimile machine (FAX) 90 is plugged into another port. Each of the ports P1–P4 are connected to the telephone lines L1 and L2 and to a port off-hook detector 11 which senses an off-hook condition, and generates a signal when one of the ports is in use.

The primary winding A of a transformer 12 is coupled to telephone line L1 through capacitor C1 and to line L2 through capacitor C2. The secondary winding B of the transformer 12 has a pair of series connected zener diodes D1 and D2 connected in parallel with the coil and one side of the coil is grounded and the other side is connected to an analog hybrid circuit 18 (described hereinafter).

A ring detection circuit is connected to the lines L1 and L2 through a rectifier 13. The ring detection circuit is in the form of a dual opto isolator 14 which is a micro chip that performs the dual function of a ring detector and of an off-hook driver. The dual opto isolator 14 detects the AC voltage on the subscriber loop (lines L1 and L2) representing an incoming call. The AC voltage coming in through lines L1 and L2 is rectified by rectifier 13. The positive (+) voltage output is connected to the primary winding A of line transformer 12 between the capacitor C1 and the winding and to the off-hook driver input of the dual opto isolator 14 through resistor R1 and into the ring detect input of dual opto isolator 14 through zener diode D3 and resistor R2. The positive (+) voltage output is also connected to the primary winding A of the transformer 12 between the capacitor C2 and the winding through the resistor R1 and capacitor C3. The minus (−) voltage output from the rectifier 13 passes to the dual opto isolator 14 and is connected through capacitor C4 to the positive (+) voltage output line between the rectifier 13 and the dual opto isolator 14.

Capacitor C4 creates a potential across the primary winding A of the line transformer 12 which creates an impedance load, so that when power runs through the ring detection circuit, there is an impedance matching drop through the line transformer 12 and the transformer is not loading up the telephone line. However, the potential across the line transformer 12 allows it to carry analog signals. The voltage passing through resistor R1 is sufficient to take the device off-hook. However, the resistor R1 does not draw the load of the telephone line down significantly and allows the voltage to stay high on the line.

The capacitors C1, C2, C3, and C4, and resistor R1 form a telephone company interface which allows the device to hear conventional dual tones generated by the buttons of a standard touch tone telephone (DTMF tones).

It is important to note that unlike most prior art devices, the ring detection circuit of the present invention does not utilize a relay, but instead utilizes a solid state dual opto isolator 14. Because there is no ring relay, the present device is always listening for an incoming signal and is substantially faster than devices utilizing a relay. It can answer in less than ¼ of a second. Thus, it is possible that a person in the house will never hear the phone ring because the present device will catch the ring signal before the telephone can actually ring. As described hereinafter, this particular transformer and dual opto isolator arrangement will allow an outgoing message to be heard thru the transformer 12, which would otherwise be impossible without the off hook driver of the dual opto isolator 14.

A pulse amplifier 15 is coupled to telephone line L2 through a capacitor C5 and to line L1 through a resistor R3 which are connected in parallel with a diode D4. The pulse amplifier 15 detects changes in the current in the subscriber loop and is always listening for pulse dials, extension off-hook detections, and canceled calls. The output of the pulse amplifier 15 is connected to a central processing unit (CPU) 16.

The central processing unit (CPU) 16 is a microprocessor chip that controls the interpretation and execution of instructions. The CPU 16 may have volatile (RAM) 50 or non-volatile memory storage (ROM) 40. In the CPU 16, reference numerals I1–I5 represent input ports and reference numerals 01–06 represent output ports. The output of the pulse amplifier 15 is connected to the input port I1 of the CPU 16. The pulse amplifier 15 is the main trigger by which all the CPU functions are governed. The output of the ring detection circuit of the dual opto isolator 14 is connected to the input port I2 of the CPU 16. The CPU output port 01 is connected through amplifier 17 to the input of the dual opto isolator 14.

The CPU 16 also has an integral ring signal generator 6 which generates a ring signal upon receiving a command signal and the ring signal generator is connected to the analog hybrid circuit 18 through output port 02 of the CPU. The CPU output port 05 is connected to the ring signal generator of the CPU 16 and is connected through amplifier 19 to an audio transducer 20. Various colored light emitting diodes LEDs (not shown) are connected between the CPU and each of the ports P1–P4 which become illuminated when the respective port is in use.

The CPU output port 04 is connected by buss lines B1 and B2 to a push-pull ring voltage generator circuit 21 of MOSFET transistors T1, T2, power transformer PT, and capacitor C6. The ring voltage generator circuit 21 is connected to each of the ports P1–P4 and can be programmed to generate various ring patterns, such as the "Standard American ring" the "European ring" the "U K (British) ring" or a "distinctive ring" recently developed by Bell Telephone Company. The Standard American ring is a 2 second ring followed by 4 seconds of silence. The European ring is two short 0.4 second rings 0.2 seconds apart followed by 2 seconds of silence. The U.K. (British) ring is a 1.5 second ring followed by 1.5 seconds of silence. The Bell Telephone Distinctive ring is a short-long-short ring pattern.

In the preferred embodiment, the fourth port P4 is designated for use with a facsimile machine (FAX) and is connected to ring in the European style ring. Since the facsimile machine (FAX) can be set to count the rings before it answers, and the European style is four fast rings followed by a pause, the facsimile machine (FAX) counts these rings and gets on-line faster than with the other ring patterns. The off-hook detector 11 connected to each of the ports P1–P4 is connected by buss B3 to input port I5 of the CPU 16 and generates a signal to the CPU when one of the device ports is in use.

The CPU output port 06 is connected to each of the ports P1–P4 by buss line B4 through a relay and internal ringer driver circuit 22 which includes a CMOS inverter driver connected to relay coils which connect the ports P1–P4 to the telephone subscriber line (L1 and L2) by means of the CPU 16. The CPU 16 generates a ring voltage to activate the devices plugged into the ports P1–P4. It should be understood that a buss line (B1–B4) may contain more than one signal path and can be connected to more than one input port on the CPU 16.

The output port 03 of the CPU 16 is connected to a digital speech processor 23 which allows an outgoing message (OGM) to be recorded and after which the message is stored in volatile Dynamic Random Access Memory (DRAM) 24 to be retrieved upon a command signal by the CPU 16. Alternatively, the outgoing message OGM may be recorded and stored utilizing non-volatile Direct Analog Storage Technology (DAST) 25. A plurality of outgoing messages may be stored and retrieved. A back-up battery power source (not shown) is preferably connected with the volatile DRAM 24 to prevent loss of the stored message in the event of a power failure, whereas the DAST 25 is non-volatile and does not require a battery back-up.

As briefly mentioned above, the secondary winding B of the transformer 12 is connected to the analog hybrid circuit 18. The analog hybrid circuit 18 processes both the ring signal and the digitized OGM signals through a coupled output amplifier 26 and input amplifier 27. The secondary winding B of the line transformer 12 is connected between the output amplifier 26 and input amplifier 27. Both the ring signal generated by the CPU 16 and the digital outgoing message OGM are feed through the analog hybrid circuit 18, but not simultaneously.

The CPU 16 controls whether the output amplifier 26 receives the ring signal or the outgoing message OGM generated by the digital speech processor chip 23. For example, if an outgoing message OGM has been started by an incoming call and is going through the transformer 12 via the output amplifier 26 and then a facsimile transmission (CNG) signal or a DTMF tone is received by the input amplifier 27 through the transformer 12, the inverting output of the output amplifier 26 is canceled by the inverting input amplifier 27. Some of the output signals from the output amplifier 26 are feed into the input amplifier to tell it to cancel the OGM sound which will allow entry of the incoming signals.

Figure 3:
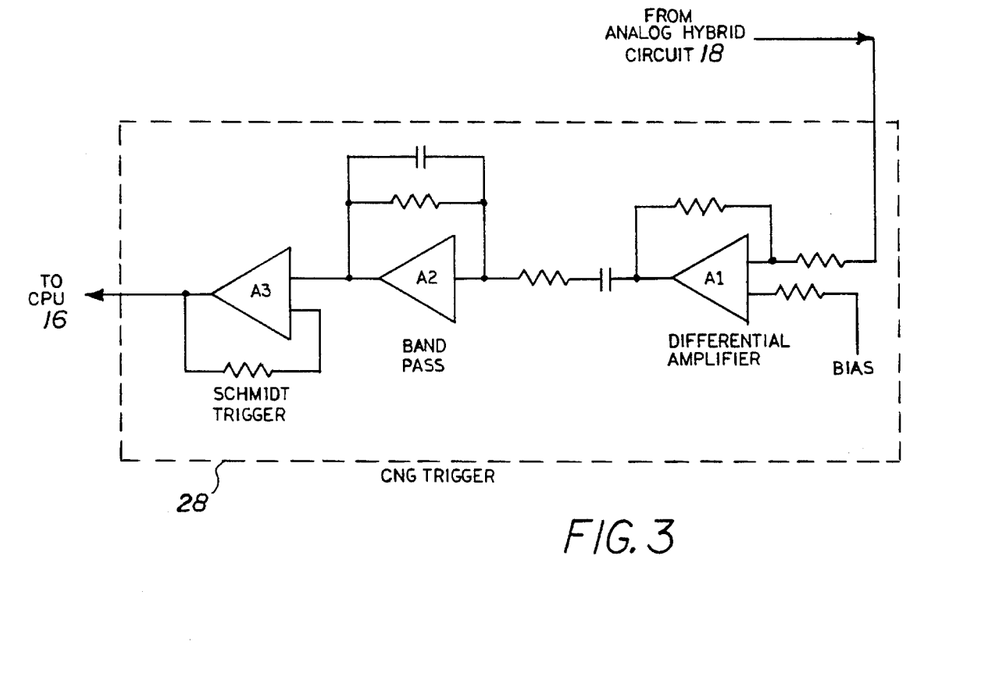
FIG. 3 is a schematic diagram which shows the three amplifiers which make up the CNG trigger shown in FIG. 1.

The input amplifier 27 of the analog hybrid circuit 18 is connected through a CNG trigger 28 to the input port I3 of the CPU 16, and through a DTMF filter 29 and DTMF decoder 30 to input port I4 of the CPU. As shown in greater detail in FIG. 3, the CNG trigger 28 is made up of three amplifiers. The first amplifier A1 substantially filters the CNG calling signal and the second amplifier A2 serves as a band pass filter which will pas CNG signal having a frequency of 1100 HZ. The third amplifier A3 of the CNG trigger 28 is a Schmidt trigger which makes the signal a square wave to create a digital signal which the CPU will recognize (approximately 1050 to 1150 HZ pulse width modulation).

The incoming calling signal (CNG) is a single tone, whereas the dual tones (DTMF) are two tones in sets. The dual tone filter 29 takes the output of the input amplifier 27 of the analog hybrid circuit 18 and sets it at a predetermined level. The level of both the CNG and DTMF signals come in at the same volume but the CNG trigger 28 filters and causes the digital output, whereas the DTMF filter 29 passes the analog (sinisoidal) output into the DTMF decoder 30. The DTMF decoder 30 may include an integral operational amplifier (filter) 100 as part of the chip itself which allows the signal amplitude to be adjusted, or, as shown in FIG. 1, may be a separate component 29. The DTMF decoder 30 decodes the dual tones (DTMF) into binary data signals. The CPU 16 interprets the binary data signals back into recognizable keypad data.

OPERATION

Figure 2:
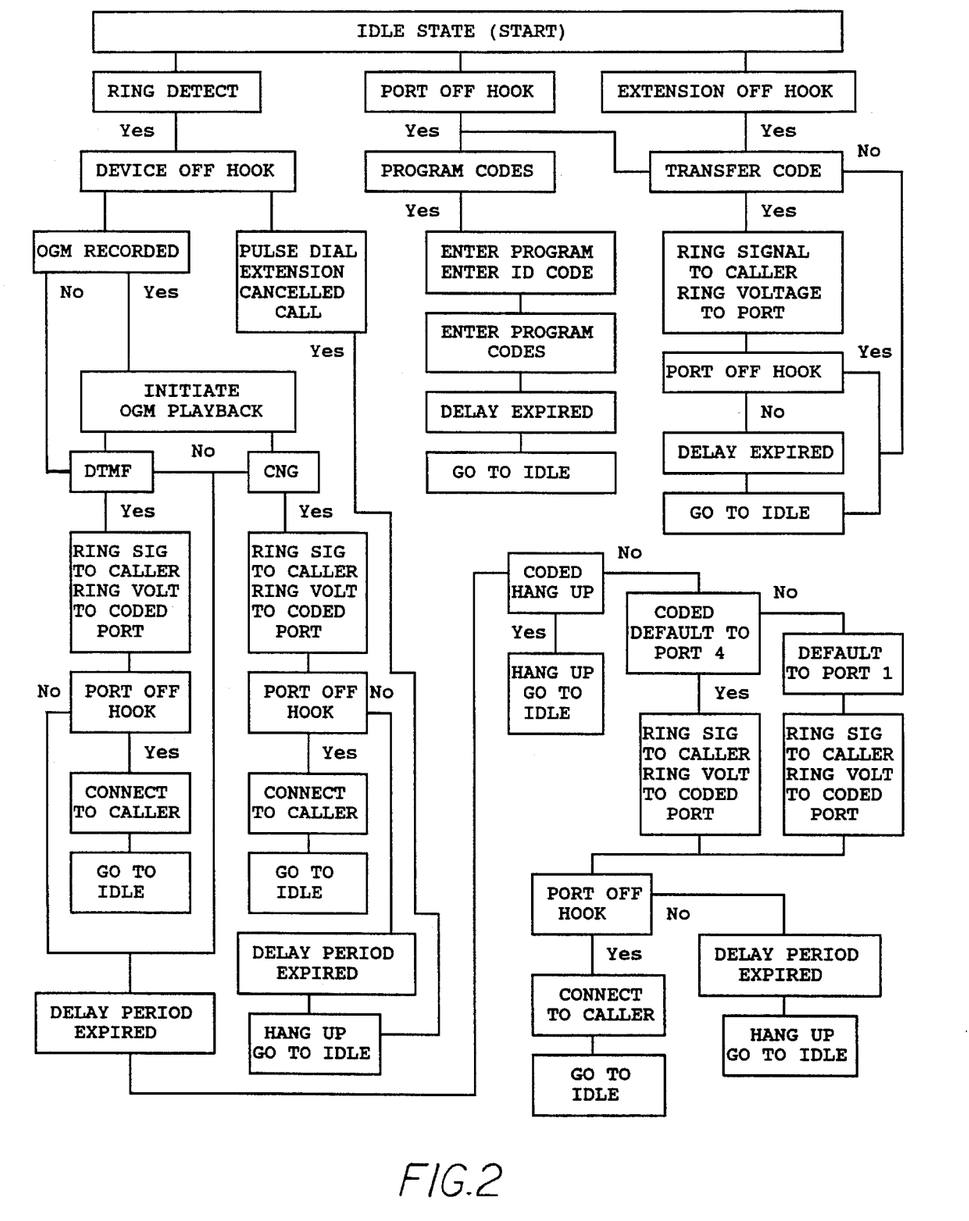
FIG. 2 is a flow chart showing the steps performed by the programmable telephone interface device.

Referring now to FIG. 2, the operations performed by the programmable telephone interface device will be explained. The device is connected to the telephone lines by plugging it into a conventional telephone outlet jack. Various devices to be interfaced with the device are plugged into the ports P1, P2, P3, and P4. In the preferred arrangement, at least one standard telephone is plugged into one port, a Telephone Answering Device (TAD) is plugged into another port, and a Facsimile machine (FAX) is plugged into another port. As explained hereinafter, the facsimile machine FAX is preferably plugged into the fourth port P4.

The programmable telephone interface device is provided with initial default settings for the port codes and some operational programs already in the CPU which can be selectively invoked by punching in dual tones from the touch tone push buttons of a standard touch tone telephone. The purchaser may invoke a security code program to prevent unauthorized access to the programing mode by entering a personal identification number (PIN).

Unlike some devices which require that the phone line be disconnected while you engage the program or others which require programming in an isolated manner off-line, the present device allows entry into the programming mode while it is connected to the telephone line. In the idle state using any telephone plugged into a port, the user can begin programming via the "transparent" telephone interface (explained hereinafter).

To enter the program without having entered the PIN number, the authorized user picks up any one of the port telephones After hearing the dial tone, the user presses "##", and the CPU issues an acknowledgement beep tone, and the device enters the programming mode. In the event that a PIN number has been entered, the user would need to enter the PIN to gain access to the program mode.

As illustrated in the center column of FIG. 2, after gaining access to the program mode and hearing the beep tone, the user can start entering program codes which are simple program strings of digits. For example to change a port access code number; the first digit would tell the CPU that the user is going to change a port access code number, after hearing an acknowledgement beep, the user enters the second digit which is the number of the port to be changed, after another beep, the user can enter can enter any access code up to 6 digits then press "*" which tells the CPU that is the end of the string and the CPU responds with two beeps acknowledging that the string was received and entered. After a predetermined period of time has elapsed with no entry codes, the device will return to the idle state.

To enter a PIN, the user presses "0" and the CPU issues an acknowledgement beep tone, and after hearing the acknowledgement beep tone, the user can enter a PIN number which is a code of a minimum of four digits and end the entry by pressing the "*" button. The CPU responds with two beeps acknowledging that the PIN string was received and entered. Once entered, the PIN number must always be entered before access is allowed to the program mode. If the device has volatile memory, the only way to bypass the PIN number would be to unpower the device. If the device has non-volatile memory, it will be provided with a "back door key" which is a three pin device with a serial number encoded at the factory. In the event of a failure to access the program mode or a forgotten PIN number, the user would have to call the factory and give them the serial number of the device and the factory would give them the PIN number and the programming sequence which would allow them to override the programming access code.

The user can record a personalized out going message (OGM) by entering a message access code number; the first digit would tell the CPU that the user is going to record or change the outgoing message, after hearing a confirmation beep, the user records the message then presses "*" which tells the CPU that that is the end of the message and the CPU responds with another beep acknowledging that the message was recorded.

The outgoing message recorded by the user may inform the caller which code numbers to press to gain access to the various devices plugged into the ports of the device. If the user wants to limit the number of unwanted incoming calls or limit access to the devices controlled by the interface device, he can inform selected persons of the code numbers and delete the code number information from the outgoing message. The outgoing message may then include a statement such as "if you know your party's extension please enter the code". If no code number is entered after a predetermined period of time, the device can hang up, or ring through to a telephone answering device (TAD).

Once the PIN number has been entered the authorized user can access the device from any touch tone phone in the world. The user can call in, get their own outgoing message (OGM) and while the message is playing, press "##" to tell the CPU that the caller is calling in remote to enter the program and then enter their PIN number to gain access to the program and change other programming codes.

The programmable telephone interface device has a "toll blocking" program which can be turned on or off by punching in a dual tone code number which will allow the device to block 1-900, 0-900, 1-976, and 0-976 calls. The user can also selectively evoke a "pulse dialing" program to allow or inhibit a telephone to do pulse dialing.

The programmable telephone interface device has a "ring voltage generator" program whereby the ring voltage sent to each of the ports can be selectively programmed for various ring patterns, such as the "Standard American ring", the "European ring", the "U. K. (British) ring", or a "distinctive ring" recently developed by Bell Telephone Company. Since the conventional facsimile machine FAX can be set to count the number of rings before it comes on-line, the default setting of the ring type for the fourth port is the European style ring pattern which is four fast rings followed by a pause. The FAX machine counts these rings and gets on-line faster than with the other ring patterns.

As shown in FIG. 2, after the device has been properly connected and configured, it is in an idle or start state. In the idle state, the device is monitoring the line and waiting for a ring detect signal, an off-hook signal from an extension phone, or a port off-hook signal indicating that a telephone or device connected to any of the ports is in use.

If none of these conditions exist, and while in the idle state, as illustrated in the right hand column of FIG. 2, the user can perform transfer functions from any telephone plugged into the device or any extension phone on the same line. The user can pick up the phone and punch in a transfer command ("#" plus the access code) creating a dual tone which tells the CPU to ring the port corresponding to the code number. This allows the user to bring the device plugged into the port on-line, such as the telephone answering device TAD or the fax machine FAX or another telephone that is on any of the ports. After a predetermined period of time has elapsed with no entry codes, the device will return to the idle state.

As illustrated in the left hand column of FIG. 2, in the idle state, when the device detects an incoming ring signal, it will come off-hook and determine if a port device has gone off-hook. If no off-hook signal is received, and if there is no recorded outgoing message (OGM), the device will listen for 4 seconds for a calling signal (CNG) or dual tones (DTMF). If no input tones are received, it will then go to the answering machine plugged into the default port. However is an outgoing message (OGM) is recorded, the device will announce this message upon receiving an incoming ring signal. The CPU generates a ring signal which is heard by the caller and will ring the appropriate port and the answering machine will come on-line and whoever is calling can leave a message. If a facsimile machine FAX were calling, and a fax machine FAX was plugged into the appropriate port, the device would recognize the calling signal of the calling FAX and the user's FAX would connect to the calling FAX.

If an outgoing message OGM had been recorded, the device would play the digitally recorded message. As the message is announced, the device will be listening for incoming calling signals (CNG) as well as dual tones (DTMF) through the analog hybrid circuitry. If, however, a canceled call signal should be sensed via the pulse amplifier, the device will hang up. If it hears the CNG signal (FAX calling signal), then it will trigger the CPU to recognize the signal and ring the proper port. If it hears a dual tone (touch tones from a push button telephone), the DTMF signal will be decoded by the decoder and the CPU will ring the appropriate port corresponding to the dual tone code via the ring generator.

After the device rings one of the ports and the port goes off hook, then it will connect to the caller and the device will go back to the idle state and is again listening for any signals. For example, if the call was a regular voice call, and the user picked up the telephone and after speaking for a time the caller wanted to send a FAX, the user merely has to press the "#" button to indicate to the CPU that the user is making a transfer, and then punch in the dual tone code to tell the CPU which port to bring on-line.

The device has the capacity to detect a reverse modem signal (RMS) which is transmitted by a calling modem during an outgoing message (OGM). The reverse modem signal (RMS) is composed of an analog audio signal in the initial phase of 1800 HZ and in the secondary phase of 2225 HZ, both of which are detectable by the device. When this signal is detected, the ring generator rings the modem port. The modem port is protected from accidental barge-in from other devices connected to the programmable telephone interface device.

The device has the capacity to delay answering the incoming ring signal from the telephone company from instataneous answer to a delay of one ring so that data transmitted between the ring signals can be deciphered by "caller I.D." data devices.

The programmable telephone interface device can also be installed at the input end of a Key Set Unit (KSU). If the user wanted the device to ring a specific port on the KSU (for example extension 2356), the caller would enter that extension and it would ring direct through to that port on the KSU. Even if the device is installed at the front end of the KSU, the operation is not limited. For example, if the FAX is connected in a different room from the location of the person answering the call, the person answering just presses the dual tone code for the FAX port to transfer the call to the FAX.

One of the major features of the programmable telephone interface device is that it does not have to listen or wait for the dial tone signal to continue operating. The telephone company performs a current interruption known as a "loop subscriber cancellation pulse" when a caller hangs up. The instant a person cancels their call, this current interruption occurs on the line and then after about 20 or 30 seconds, the dial tone comes on the line. Most prior art answering systems respond only to the delayed dial tone, whereas the present device senses and responds to the current interruption on the line rather than the dial tone. For example, if a caller calls and the device answers and the caller then hangs up, the device will detect that pulse and reset to the idle state ready to receive another call much faster than devices which reset in response to the dial tone.

If two or more telephones are plugged into the ports, the present device can intercom between ports by using one of the telephones and entering a DTMF transfer code. A transfer code is "#" plus the access code for the port being rung. For example, a caller on a telephone plugged into port 2 can enter "#,1" which will initiate a transfer ring to port 1 and the telephone plugged into port 1 will ring. Once the telephone on port 1 is answered, the two callers can converse, in an intercom mode, off of the telephone company line. If another call comes in on the main telephone line while the two callers are on intercom, they will hear the ring signal produced by the CPU in their handsets informing them that a call is coming in. They can either both hang up and let the device answer the call, or one of the users may answer the call after both users have hung up from the intercom mode. There is no time limit for conversing on intercom.

Another major feature of the device is that the pulse amplifier is always listening for any signal on the telephone line such as pulse dials, extension off hook detections, and canceled calls. The analog hybrid circuit provides the capability to hear dual touch tone signals and to engage the transformer without the transformer actually going off-hook. The solid state ring detection circuit having a dual opto isolator chip performs the dual function of a ring detector and of an off-hook driver. Thus, there is no relay engaging the transformer, and the transformer of the present device is in effect "transparent" to the subscriber loop. In other words, the telephone line doesn't know it is there until the CPU invokes the off-hook driver of the ring detection circuit which then places a load on the subscriber loop and takes it off-hook. The transformer can be used for carrying analog signals on the line without loading up the line.

Also because there is no relay in the ring detection circuit of the present device and it is always listening, it is substantially faster than devices utilizing a relay. It can answer in less than ¼ of a second. Thus, it is possible that a person in the house will never hear the phone ring because the present device will catch the ring signal before the telephone can actually ring.

In the preferred embodiment, the device is preprogrammed (contains a program) to allow an authorized user to change everything but the outgoing message OGM from a remote call because in some installations, such as a business enterprise, the OGM is relatively important, and an attempt to change the OGM from a remote call may result in undesirable noise, poor quality, etc.

Because the programmable telephone interface device is extensively programmable and has the capability of port configuration, outgoing messages, internal ringers, pulse amplifiers, etc., it has substantially all the basic components for various types of communications. The Input/Output ports of the CPU are not limited to those described, and various other peripheral devices may be connected to the CPU. The present device may also be provided with interchangeable CPU chips with different software programming and operating systems responsive to dual tones and incoming call signals. A user can select various operating functions by purchasing the latest version of the communication or interface program without having to purchase a whole new unit. In other words, the existing CPU chip may be removed from the circuit board and a differently programmed chip may be plugged into the same pin sockets where the previous chip was without having to make any changes to the existing components which are connected with the input and output ports.

For example, a "Global Connect" program has been written which allows a person to make long distance calls from a remote location. With this program in the CPU, a person taking a trip to a foreign country where the telephone rates for calling the U.S. are higher than the rates from the U.S. to the foreign country can take advantage of the least expensive rate. Before the person leaves the U.S., the phone number where he or she will be in the foreign country and the number of rings to be counted before the device calls out can be entered into the CPU. From the foreign country, the person can call his U.S. phone number, let the telephone ring the predetermined number of times, then hang up. The device, since it is always listening, picks up the signal and counts the number of rings. If the number of rings match the pre-designated number of rings followed by a hang up, the device will then call the designated phone number in the foreign country. The person in the foreign country can answer the call from the device and be on-line with the device at the lower U.S. rate. After the person answers the call originated by the device, they press the "##" button and enter another code telling the device to generate a dial tone. The device then enters a "three-way" calling mode. The person can then punch in the number of a third party and talk with them at the lower U.S. rate.

While this invention has been described fully and completely with special emphasis upon a preferred embodiment, it should be understood that within the scope of the appended claims the invention may be practiced otherwise than as specifically described herein.

I claim:

1. A programmable telephone interface device for connection to a telephone subscriber line to automatically control the operation of facsimile equipment and telephone equipment comprising:

a microprocessor in said programmable interface device having integral ring signal generating means, memory means, and stored programs for receiving and interpreting digital signals and carrying out operations in response thereto including selecting a port to receive a ring signal;

a transformer in said programmable telephone interface device having a primary winding coupled to a first line and a second line of the telephone subscriber line, and said transformer having a secondary winding with one side of said secondary winding grounded and its other side connected with said microprocessor through an analog hybrid circuit which processes both incoming analog signals and digitized or analog outgoing messages;

a plurality of ports on said programmable telephone interface device connected with said microprocessor and said first and second lines of the telephone subscriber line including; at least one telephone port for connecting a telephone, at least one telephone answering device port for connecting a telephone answering device, and at least one facsimile port for connecting said facsimile equipment;

ring detection means connected with said microprocessor and the telephone subscriber line for detecting AC ring voltage representing an incoming telephone call;

DC pulse detecting means connected with said microprocessor and the telephone subscriber line for detecting a loop subscriber cancellation pulse on the telephone subscriber line;

signal detecting means connected with said microprocessor and the telephone subscriber line for detecting the presence of various signals on the telephone subscriber line including; a facsimile transmission signal, and DTMF tones;

said signal detecting means comprises signal filter and decoding means for filtering and decoding said DTMF tones and converting them to digital signals to be interpreted by said microprocessor and band pass filter means for filtering said facsimile transmission signal and converting it to digital signal to be interpreted by said microprocessor;

recording and playback means connected with said microprocessor and the telephone subscriber line for recording an outgoing message and playing said recorded outgoing message over the telephone subscriber line; and ring voltage generating means connected with said ring signal generating means of said microprocessor and said plurality of ports for generating and sending a ring voltage signal to a selected one of said plurality of ports; whereby upon an AC ringing voltage on said telephone subscriber line representing said incoming telephone call being detected by said ring detection means, the type signal on the telephone subscriber line is detected by said signal detecting means and is filtered, decoded, and converted to digital signals, and the digital signals are interpreted by said microprocessor, and said microprocessor selects one of said plurality of ports corresponding to the type of signal detected and causes said ring voltage generating means to generate and send a ring voltage signal to said corresponding port to activate said telephone, said telephone answering device, or said facsimile equipment connected with said corresponding port;

one type of ring voltage signal being sent to said facsimile port if the detected signal is the facsimile transmission signal or a predetermined DTMF tone representing said facsimile port, another type of ring voltage signal being sent to said telephone port or said telephone answering device port if said signal detecting means does not detect the presence of the facsimile transmission signal or if the detected signal is a predetermined DTMF tone representing a particular port.

2. The programmable telephone interface device according to claim 1 including audio transducer means connected with said microprocessor for emitting an audible signal representing a telephone ring signal to indicate that said ring voltage generating means is sending a ring voltage signal to one of said plurality of ports.

3. The programmable telephone interface device according to claim 1 including status detection means connected with said plurality of ports and said microprocessor for detecting whether or not said telephone, said telephone answering device or said facsimile equipment is in an off-hook condition and generating a status signal in response to the detected condition.

4. The programmable telephone interface device according to claim 1 in which said primary winding of said transformer is coupled to said first line of the telephone subscriber line through a first capacitor and to said second line of the telephone subscriber line through a second capacitor, a pair of series connected zener diodes are connected in parallel with said secondary winding of said transformer.

5. The programmable telephone interface device according to claim 4 in which said analog hybrid circuit includes an output amplifier and an input amplifier coupled together; and said secondary winding of said transformer is connected between said output amplifier and said input amplifier; and in the event that the facsimile transmission signal or a DTMF tone is received by said input amplifier through said transformer while said outgoing message started by an incoming call is being carried through said transformer via said output amplifier, then the outgoing message carried via said output amplifier is canceled by said input amplifier to allow entry of said facsimile transmission signal or DTMF tone.

6. The programmable telephone interface device according to claim 5 in which said signal filter and decoding means is a series connected DTMF filter and DTMF decoder, said band pass filter means is a CNG trigger circuit, and said input amplifier of said analog hybrid circuit is connected to an input port of said microprocessor through said CNG trigger circuit and to another input port of said microprocessor through said series connected DTMF filter and DTMF decoder.

7. The programmable telephone interface device according to claim 6 in which said CNG trigger circuit is made up of three amplifiers, one of which substantially filters the facsimile transmissions, another one of which serves as the band pass filter means which will initially pass the facsimile transmission signal having a frequency about 1100 HZ and another one of said amplifiers serves as a Schmidt trigger for converting said facsimile transmission sign into a square wave to create a digital signal having a pulse width modulation which said microprocessor will recognize.

8. The programmable telephone interface device according to claim 6 in which said DTMF filter filters the DTMF tones from said input amplifier of said analog hybrid circuit and sets the DTMF tones at a predetermined level and passes the DTMF tone to said DTMF decoder, and said DTMF decoder includes an operational amplifier which allows the amplitude of said DTMF tones to be adjusted and decodes said DTMF tones into binary signals which said microprocessor will recognize.

9. The programmable telephone interface device according to claim 4 in which said ring detection means includes a rectifier connected to said first and second lines of the telephone subscriber line and a dual opto isolator connected between said rectifier, said transformer, and said microprocessor; and said dual opto isolator performing the dual function of a ring detector and of an off-hook driver; whereby said dual opto isolator detects the AC ringing voltage on the telephone subscriber line representing an incoming call and the AC voltage is rectified to DC voltage by said rectifier;

a positive output of said rectifier joined to said primary winding of said transformer between said first capacitor and the primary winding and to an off-hook driver input of said dual opto isolator through a first resistor and into a ring detect input of said dual opto isolator through a zener diode and a second resistor, said positive output of said rectifier also joined to said primary winding of said transformer between said second capacitor and said primary winding through said first resistor and a third capacitor, and a negative output of said rectifier passing between said rectifier and said dual opto isolator joined through a fourth capacitor to said positive output passing between said rectifier and said dual opto isolator;

said fourth capacitor causing a potential across said primary winding of said transformer which creates an impedance load, such that when power is passing through the telephone subscriber line, there is an impedance matching drop through said transformer to prevent said transformer from loading up the telephone subscriber line and a potential is established across said transformer sufficient to allow said transformer to carry analog signals; and the voltage on said positive output of said rectifier passing through said first resistor is sufficient to take said telephone interface device off-hook without significantly reducing the voltage on the telephone subscriber line.

10. The programmable telephone interface device according to claim 9 in which said DC pulse detecting means includes a pulse amplifier having a first input connected to said second line of the telephone subscriber line through a fifth capacitor and a second input connected to said first line of the telephone subscriber line through a third resistor, said fifth capacitor and said third resistor joined in parallel by a third diode, and said pulse amplifier having an output connected to said microprocessor;

said pulse amplifier constantly monitoring the telephone subscriber line to detect changes in the current representing pulse dials, off-hook signals, and said loop subscriber cancellation pulse representing a cancelled call.

11. The programmable telephone interface device according to claim 1 in which said memory means of said microprocessor is volatile memory.

12. The programmable telephone interface device according to claim 1 in which said memory means of said microprocessor is non-volatile memory.

13. The programmable telephone interface device according to claim 1 in which said ring voltage generating means is selectively programmable to generate various ring patterns including a standard American ring pattern, a European ring pattern, a British ring pattern, and a distinctive ring pattern.

14. The programmable telephone interface device according to claim 13 in which said ring voltage generating means is connected with said at least one facsimile port and is programmed to generate a European ring style of two short 0.4 second rings 0.2 seconds apart followed by 2 seconds of silence, such that said facsimile equipment connected with said facsimile port may be set to answer on the fourth ring and will answer more quickly than if activated by said standard American ring, said British ring, or said distinctive ring patterns.

15. The programmable telephone interface device according to claim 1 in which said recording and playback means includes a digital speech processor having memory storage means which allows at least one outgoing message to be recorded and stored in said memory storage means and retrieved upon a command signal by said microprocessor.

16. The programmable telephone interface device according to claim 15 in which said memory storage means of said recording and playback means is volatile dynamic random access memory.

17. The programmable telephone interface device according to claim 15 in which said memory storage means of said recording and playback means is non-volatile direct analog storage technology.

* * * * *